Patented Nov. 21, 1939

2,180,897

UNITED STATES PATENT OFFICE 2,180,897

COMPOSITION

Norman J. Dunbeck, Eifort, Ohio, assignor to Eastern Clay Products, Inc., Eifort, Ohio, a corporation of Ohio No Drawing. Application February 3, 1939, Serial No. 254,497

7 Claims. (Cl. 22—188)

My invention relates broadly to compositions of matter and more particularly to such compositions as are used as binders for foundry purposes and to the foundry compositions employing such binders.

One of the objects of my invention is the provision of a bonding agent which is comparatively inexpensive, readily accessible and efficacious in use.

Another object is the provision of a binder for foundry purposes which in use with sand gives a sand which has desired high green strength with a desired moderate dry strength, which is soft and free from stickiness, which has a high sintering point, a low contraction at high temperatures, and which is readily available at a minimum cost.

A further object of my invention is the provision of a foundry mold composition of good flowability which is readily rammed about a pattern, which gives a strong permeable mold without accompanying objectionable baking of sand, especially in interior sections, which does not contract appreciably upon drying, which burns onto the casting only to a minimum extent, and which readily may be recovered and further used.

Other objects in part will be obvious and in part pointed out hereinafter.

The invention accordingly consists in the combination of elements, mixture of materials and composition of ingredients, and in the several steps and the relation of each of the same to one or more of the others as described herein, the scope of the application of which is indicated in the following claims.

As conducive to a clearer understanding of certain features of my invention, it may be noted at this point that in heretofore known foundry practices, as in forming a mold, for example, a certain amount of bonding clay is added to silica sand. This mixture is tempered with water to give a moist workable mass. Where desired, a certain amount of burnt or bonded sand is used as a substitute for a part of the clean sand employed.

The mold composition is rammed about a desired pattern, positioned within a molding flask. The clay present in the mold mixture gives workability and strength to the sand, particularly to the upper half of the mold, as contained in the cope, in order to prevent dropping, breaking or disintegration in drawing the pattern or in subsequent handling. The presence of a large amount of clay, however, is not desired because it decreases the permeability of the mold. This permeability is essential to a proper elimination of gas evolved from the contact of hot metal with the mold walls.

The amount of bonding clay employed varies with a number of factors. Fine-grained sands require less binder than coarse sands. Sands consisting of rough irregular grains require less bonding material than do the sands of smooth rounded grains. The nature of the work, too, must be taken into consideration. Small light work can be made with a comparatively weak sand. Large work on the other hand requires a strong mold, since it must possess sufficient strength to be self-sustaining. When a certain amount of burnt or used, sand is employed, less of the clay is necessary since some clay already is present in the used material. Ordinarily, the amount of bonding clay employed ranges from 5% to 30% of the mass of mold mixture.

At the present time, a number of bonding clays are in use. The fire clays, clays largely comprising kaolinite, probably are in greatest use. Certain of the non-refractory clays have found favor in some classes of work. These clays commonly are of the glacial age and predominate in minerals of the sericite type.

While both the refractory and non-refractory clays mentioned above are available in numerous localities throughout the United States, only a limited increase in the strength of a mold accompanies their usage. Moreover, the quantity of these clays necessary to achieve a substantial strength is inclined to severely curtail the permeability of the mold. Hence in using these clays, a balance is struck between these factors, the final result achieved being entirely satisfactory from neither standpoint.

Another clay which is suitable as a bonding agent is Wyoming bentonite. This clay gives a desirable high permeability. Certain disadvantages are attendant its use, however, as noted more particularly below. The clay is colloidal in character but unfortunately swells considerably upon being placed in water.

The swelling property in wetting is accompanied by a sharp increase in volume of the mixed sand, thus requiring greater ramming effort in forming the mold. This sand has a tendency to swell, cut and scab. Moreover, the hardening of the mold from heating renders the flasks difficult to shake out. This property also frequently causes a cracking of the castings, especially in malleable foundry practices, because of a failure of the sand, in an interior section, to collapse upon cooling. In addition, the sand, after usage, is lumpy and much is lost in screening operations along with core butts,ced wedges and other refuse.

In spite of the advantage of high green strength and permeability obtainable in a mold using Wyoming bentonite as a binder, the certain disadvantages noted, together with the element of cost in handling and transporting the Wyoming bentonite are such as to substantially curtail its use in the Eastern part of the country. It appears that the differential in efficacy as a binder over the more readily available materials does not warrant the expense involved.

One of the objects of my invention, accordingly, is the provision of a bonding composition which is readily available to Eastern markets, which gives a foundry composition of high flowability permitting an easy ramming about a pattern, which lends a high green strength to a mold, which in use materially lessens the limiting effect on permeability encountered with heretofore known ingredients, which causes no objectionable contraction of the mold at high temperatures, which gives a mold composition of high sintering point and which readily collapses in interior sections and moreover which permits high recovery of that mold composition after use.

Considering now the practice of my invention, I find that certain non-swelling, colloidal montmorillonite clays possess excellent bonding properties. Typical examples of the non-swelling, colloidal montmorillonite are the deposits found just south of Little Rock, Arkansas; the deposits near Monroe, Louisiana, near Jackson and Laurel, Mississippi, and near Pontotoc, Mississippi; those near Cunningham, Alabama and similar deposits in other States. The clay is now being obtained at Cunningham, Alabama and near Pontotoc, Mississippi.

Some confusion exists as to the proper name to be applied to the non-swelling, colloidal montmorillonite. When swelling, colloidal montmorillonite was discovered in Wyoming about 40 years ago, the geographical name bentonite was applied as it was found in the Fort Benton rocks. The science of identifying and correctly naming clays based upon their mineral composition was not developed at that time. In later years, as other clays were discovered in other locations that had some similarity to bentonite, that name was applied to them. This has not been satisfactory as the clays often have radically different chemical and physical properties. To attempt to differentiate between them, various writers have termed these materials: bentonitic clay, bentonite, sub-bentonite, false bentonite, pseudo bentonite, alkali bentonite, acid bentonite, bentonoid, fuller's earth, bleaching clay and the like coupled with the correct basic description montmorillonite. Many writers have suggested that the name bentonite be dropped in favor of more specific and descriptive names for each type of material.

It is to be noted at this point that the term "non-swelling", as applied to montmorillonite clays, has a definite significance to geologists, ceramic engineers, physicists and chemists. Now all clays are known to swell to some extent when placed in water. These are taken to be essentially non-swelling, however. A swelling clay is characterized by Wyoming bentonite. The distinguishing and identifying feature of Wyoming bentonite or montmorillonite is the tremendous swelling which takes place on addition of water. Swelling bentonites will form a stiff gel with several times their own weight of water. These are considered to be swelling montmorillonite clays. The non-swelling montmorillonite clays are those which may exhibit some slight swelling but not of the same order as the true swelling bentonites of Wyoming. See, for example, Industrial Minerals and Rocks, published 1937 by the American Institute of Mining and Metallurgical Engineers, especially page 129. See also, Ceramic Industry for February, 1939, page 55, the article entitled "Bentonite."

Also, it should be noted at this point that the terms colloid or colloidal may be variously defined depending upon different viewpoints in the various sciences. In foundry practice, the term colloidal may be taken to be descriptive of the particle size of the clay. A colloidal clay is usually considered as one which largely consists of fine particles of one micron or less.

In making a foundry mold in accordance with my invention, there is added to clean silica sand, or silica sand including a certain proportion of burnt sand as desired, about 5% of the non-swelling, colloidal montmorillonite clay, occasionally referred to as a non-swelling colloidal bentonitic clay or a sub-bentonite, illustratively an acid bentonite (pH value less than 7 in aqueous mixture). The whole is mixed in the usual foundry mixers to obtain a fairly uniform consistency. Water is then added in desired amount, ordinarily about 3–5% by weight. The mixing is continued, giving a uniform mix of desired strength. This mold mix is then used in preparing a sand mold in accordance with well-known methods.

My mold composition is easily handled. It is not gummy or sticky. It flows freely. It is readily rammed about a pattern using a conventional jolt of other type molding machines. The sand packs tightly about the pattern. A smooth surface results accurately following the details of the pattern. The mold is strong and durable. It is well retained in the cope as the pattern is drawn. The mold from which the pattern is withdrawn is clean-cut and free of edge breaks and cracks. A minimum of repair to the mold before use, therefore, is required. At the same time, however, the mold is permeable to the fumes and gases encountered in actual practical use.

In addition to the highly desirable properties noted above, my mold composition is strong and well adapted to practical use. Actual tests upon samples of my mold compositions show an increase in green compression strength, a desired decrease in dry strength and an increase in permeability over known montmorillonite clay mold compositions.

The improved nature of the molding composition of my invention is illustrated in the following tests. Sample mixes are prepared comprising 95% clean unbonded silica sand with 5% of each clay. These are mulled in a laboratory muller, and then tested. The tests are made in accordance with published recommended procedure of the American Foundrymen's Association. As a matter of convenience the test information is presented in the following table:

| Composition | Green compression strength | Dry compression strength | Green permeability |
|---|---|---|---|
| 5% swelling, colloidal montmorillonite (Wyoming bentonite), balance silica sand | Lbs. per sq. in. 8.69 | Lbs. per sq. in. 63.1 | 171 |
| 5% nonswelling, noncolloidal montmorillonite (Porter's Creek clay, see my recent Patent 2,128,404), balance silica sand | 8.94 | 28.6 | 172 |
| 5% nonswelling, colloidal montmorillonite (Pontotoc, Mississippi clay), balance silica sand | 12.38 | 27.9 | 181 |

A mold in accordance with my invention is resistant to heat and "burning on" of sand particles to the casting because of the high sintering temperature of 2500 to 2600° F. as compared with 2300 to 2400° F. for molds using Wyoming bentonite as a binder. The mold has substantially no contraction at high temperatures, about .05% at 2400° F. The formed castings, therefore, are free of fins, scabs and like imperfections found in heretofore known products.

It is noted from the table given above that the specific composition covered by my Patent 2,128,404 and containing non-swelling, non-colloidal montmorillonite, gives higher green strength and permeability than does swelling, colloidal montmorillonite. In addition, that composition had a most desirable moderate dry strength. It should be noted that the composition of my present invention retains the desirable features of moderate dry strength, good flowability and ramming properties, high sintering point, low contraction at high temperatures of the compositions covered by my Patent 2,128,404. In addition, it offers the new and desirable feature of 42.4% higher green strength than swelling, colloidal montmorillonite, such as Wyoming bentonite.

My new composition also has the important advantage over the compositions covered by my Patent 2,128,404 of being workable at lower moisture content and mixing faster. The lower moisture content is desirable since such moisture constitutes the major portion of gas which is evolved from a mold. The faster mixing is particularly important in large production foundries where only limited mixing time is possible.

With most clays, as the green strength of a composition increases, the permeability decreases. This is not true in my present composition. It is particularly noteworthy that in my mold composition illustrative tests show an increase of 5.8% in permeability accompanies the increase of 42.4% in green strength. This is a most surprising result. Foundrymen desire the highest possible green strength since they may then use a minimum quantity of clay which results in high permeability, less dead clay and fines in the sand, and other advantages apparent to those skilled in the art.

As a further feature in connection with my mold composition, the dry strength is of moderate value, being only about 40% of a mold using Wyoming bentonite as a binder. For this reason, the sand readily may be shaken from the flask and recovered for further use. Savings in cleaning the castings are directly realized. Sand in interior sections collapses permitting ready contraction of the metal in cooling and assuring freedom from cracking of the piece.

Thus, it will be seen that there has been provided in my invention a composition and art of employing the same in which the various objects hereinbefore noted, together with many thoroughly practical advantages are successfully achieved. It will be seen that my bonding composition is well adapted to withstand the many varying conditions of actual operational use in many applications, particularly as a binder in sand mold compositions.

While as illustrative of the practice of my invention, description is made of a green sand mold, it is to be particularly understood that certain beneficial results are had in a dry sand mold or in either green or dry sand cores. Also, it will be understood that the various ingredients going to make up the mold composition may be mixed together in any desired sequences.

Similarly, while the amount of clay or bonding material is illustratively given as about 5% of the weight of sand with which it is mixed, it will be understood that good results are obtained when the amount of the bonding clay ranges from about 2% to 8% of the sand weight. In fact these proportions can be extended to ½% to 8% where a part of the sand consists of burnt sand since the bonding clay is reversible in character and can be used over again. Where desired, the quantity of bond clay may be mixed with sand and the mixed sand added to sand systems or heaps to maintain a satisfactory volume of sand. The total volume may sometimes become too great. In such event, to avoid discarding good sand, a mixture of 30% or even 50% of bond clay and sand might be used, a proportionately lesser quantity being added, however, in order to obtain the desired percentage relationship between clay and sand.

Although as illustrative of my invention a mold comprising silica sand and non-swelling colloidal montmorillonite clay is described, my invention is applicable to like combinations of sand and clay for other foundry uses. These include the preparation of facing sands which may consist of various combinations of new silica sand, burnt silica sand, new molding sand, burnt molding sand, lake sand or bank sand together with the bonding clay, to which may be added auxiliary binders in small quantities, such as cereal binders, cement, goulac, pitch or rosin and a casting cleaning element such as sea coal, wood flour or oils. Foundry sand compositions, comprising known sands and a non-swelling colloidal montmorillonite clay are found to possess a certain superior strength as compared to known compositions. In these the clay is directly added to foundry sands of any type which require strengthening by placing the necessary quantity of clay composition on each mold, by feeding it directly into sand handling systems, by spreading it over sand heaps or any other of the methods in common use.

As many possible embodiments may be made of my invention and as many changes may be made in the embodiments hereinbefore set forth, it is to be understood that all matter described herein is to be interpreted illustratively and not in a limiting sense.

I claim:

1. In compositions of matter of the class described, a foundry composition comprising in combination, sand and a reversible binder of non-swelling, colloidal montmorillonite.

2. In compositions of matter of the class described, a foundry composition comprising in combination, sand and about one-half per cent to eight per cent by weight of a reversible binder of non-swelling, colloidal bentonitic clay or sub-bentonite.

3. In compositions of matter of the class described, a mold composition comprising in combination, silica sand and about five per cent by weight of a reversible binder of non-swelling, colloidal clay largely comprising montmorillonite.

4. In compositions of matter of the class described, a mold composition comprising in combination, sand and a reversible binder of non-swelling, colloidal acid bentonite.

5. In compositions of matter, a foundry facing composition including a reversible non-swelling, colloidal montmorillonite clay as an essential ingredient.

6. In preparing a foundry composition, the art which includes mixing with sand a reversible non-swelling, colloidal montmorillonite clay.

7. In preparing a mold composition for foundry purposes, the art which includes mixing with sand a reversible non-swelling, colloidal clay largely comprising montmorillonite and about three per cent to five per cent of water.

NORMAN J. DUNBECK.